United States Patent
Keyser

(10) Patent No.: US 10,091,241 B2
(45) Date of Patent: Oct. 2, 2018

(54) METHOD FOR PURPOSES OF MAKING A "ZERO KNOWLEDGE" CONNECTION BETWEEN AN ELECTRONIC UNIT AND A COMPUTER

(71) Applicant: SKIDATA AG, Grödig/Salzburg (AT)

(72) Inventor: York Keyser, Salzburg (AT)

(73) Assignee: SKIDATA AG, Grödig/Salzburg (AT)

( * ) Notice: Subject to any disclaimer, the term of this patent is extended or adjusted under 35 U.S.C. 154(b) by 177 days.

(21) Appl. No.: 15/196,206

(22) Filed: Jun. 29, 2016

(65) Prior Publication Data

US 2017/0006062 A1 Jan. 5, 2017

(30) Foreign Application Priority Data

Jun. 30, 2015 (EP) .................................... 15174558

(51) Int. Cl.
*H04L 29/06* (2006.01)
(52) U.S. Cl.
CPC .......... *H04L 63/168* (2013.01); *H04L 63/062* (2013.01); *H04L 63/0853* (2013.01); *H04L 63/0272* (2013.01)
(58) Field of Classification Search
CPC . H04L 63/168; H04L 63/0853; H04L 63/062; H04L 63/0272
See application file for complete search history.

(56) References Cited

U.S. PATENT DOCUMENTS

| 8,613,091 | B1 * | 12/2013 | Vaidya | .................. | G06F 21/566 711/163 |
| 2007/0118745 | A1 | 5/2007 | Buer | | |
| 2011/0138058 | A1 * | 6/2011 | Ishida | ................. | H04L 12/4633 709/227 |
| 2014/0337920 | A1 * | 11/2014 | Giobbi | .................... | G06F 21/44 726/3 |
| 2015/0143464 | A1 * | 5/2015 | Vallee | .................... | H04L 41/12 726/3 |

FOREIGN PATENT DOCUMENTS

EP 1737194 A1 12/2006

OTHER PUBLICATIONS

European Search Report issued in corresponding European Patent Application No. 15174558.5 dated Dec. 4, 2015, 5 Pages.

* cited by examiner

*Primary Examiner* — Nelson Giddins
(74) *Attorney, Agent, or Firm* — Davis & Bujold PLLC; Michael J. Bujold

(57) ABSTRACT

A method of making a "zero knowledge" connection between a computer (2) and an electronic unit (5). At the start of the method, the configuration unit (1) is connected with the computer (2), and a web server is initiated in the configuration unit (1) via the trusted execution environment. A secure network connection is made to a server (3) by the configuration unit (1) and, via the network connection, the items of information required for connection with the electronic units, to which a connection can be made, are synchronized with the trusted execution environment. After synchronization occurs, an electronic unit (5) is selected by the web server via an input of the computer (2), to which electronic unit (5) a connection is made via the trusted execution environment using the stored, synchronized items of information, and via the web server prescribed menu-driven maintenance or configuration steps can be executed.

5 Claims, 1 Drawing Sheet

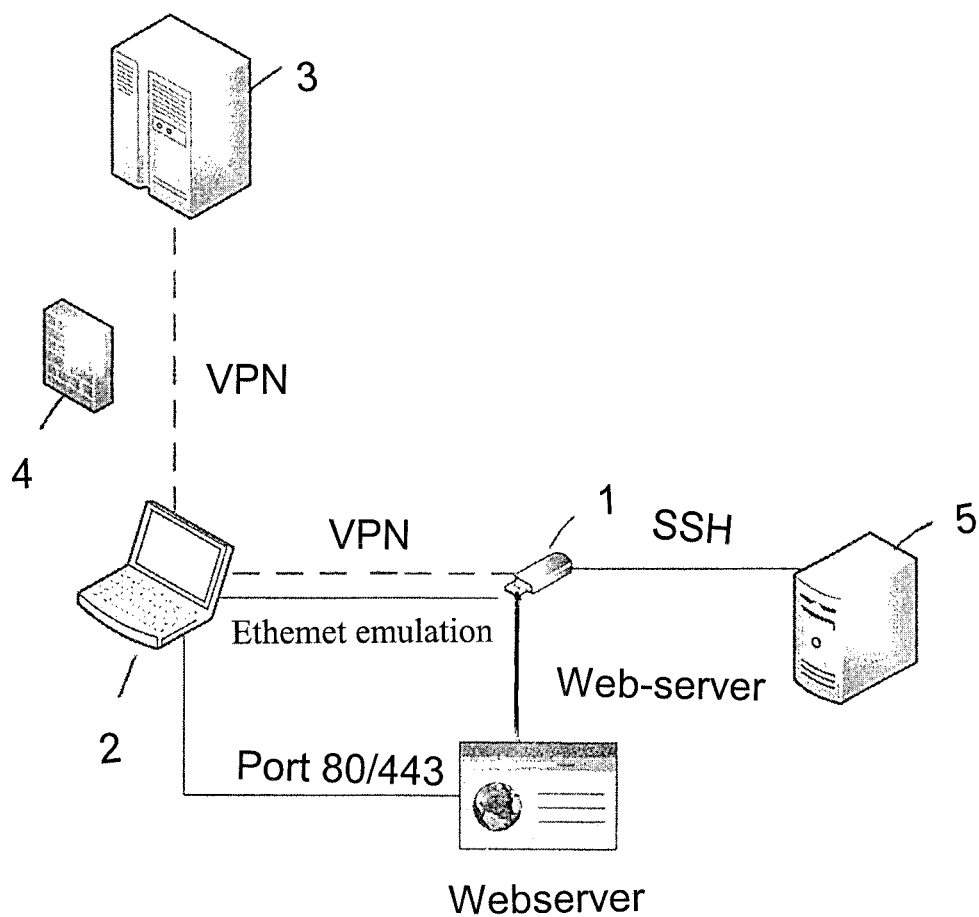

METHOD FOR PURPOSES OF MAKING A "ZERO KNOWLEDGE" CONNECTION BETWEEN AN ELECTRONIC UNIT AND A COMPUTER

This application claims priority from European patent application serial no. 15174558.5 filed Jun. 30, 2015.

FIELD OF THE INVENTION

The invention concerns a method for purposes of making a "zero knowledge" connection between an electronic unit and a computer.

BACKGROUND OF THE INVENTION

In the context of the invention a "zero knowledge" connection is a connection for purposes of data communication between an electronic unit and computer, for example, a technician's notebook, in which security-relevant data, such as RSA keys, or crypto-keys, which correspond to the current security standards, and passwords, do not have to be entered manually and are not known to the user of the computer.

From the prior art, for purposes of maintenance or for purposes of configuration of an electronic unit, for example, a vending machine or a conditional access device, it is of known art to make a direct connection between the technician's computer and the unit that is to be configured. A direct connection is required, since the firewall in the network, in which the unit to be configured is connected, must be bypassed in order to be able to access the electronic unit.

As a general rule the connection between the computer and the electronic unit that is to be configured takes place by means of the SSH-protocol (secure shell protocol), which enables a manual configuration and the alteration of parameters. This in turn means that the technician requires items of information regarding the unit and the installed operating system, together with the relevant parameters. Moreover, a knowledge is required of the passwords and, if necessary, of the RSA keys, or crypto-keys, which correspond to the current security standards, which are used in order to make a connection by means of the SSH-protocol. Since as a general rule these security-relevant items of information are stored on the technician's computer, this represents a security risk.

SUMMARY OF THE INVENTION

The task underlying the present invention is that of creating a method for purposes of making a "zero knowledge" connection between an electronic unit and a computer, in the execution of which the above-stated disadvantages known from the prior art are avoided.

Accordingly, a method for purposes of making a "zero knowledge" connection between a computer and electronic unit is proposed, in the context of which a configuration unit is used, which can be connected with a computer for purposes of data communication, and which has its own CPU, its own storage means and software, together with a so-called "trusted execution environment", namely a region in the non-volatile store and/or in the CPU to which only software that has been specially activated for this purpose has access, as a result of which a secure execution environment is made available for the said software. Such a trusted execution environment has, for example, been developed by the company ARM, with the designation TrustZone.

At the start of the method the configuration unit, which is preferably embodied as a USB-stick, is connected with the computer for purposes of data communication, wherein subsequently a web server is automatically initiated in the configuration unit by means of the trusted execution environment; the web server can be accessed via the configuration unit only by means of an emulated Ethernet port. A secure network connection, for example a VPN connection, is subsequently made to a server by means of the configuration unit, wherein by means of this connection the items of information stored on the server that are required for purposes of connection with the electronic units, to which a connection can be made, are synchronised with the trusted execution environment of the configuration unit 1.

The items of information required regarding the electronic units, to which a connection can be made, are stored on the configuration unit by means of the trusted execution environment. After the items of information required for purposes of connecting with an electronic unit are synchronised (the items of information can contain, for example, an RSA-key, a password, network parameters and environmental variables) an electronic unit is selected by means of the web server via input means of the computer, for example via the keyboard or a mouse, to which electronic unit a connection is made by means of the stored items of information, wherein by means of the web server, using the display device and the input means of the computer, prescribed menu-driven maintenance or configuration steps are executed.

The configuration unit can preferably be accessed only via the port 443 (https) or 80 (http), wherein the web server, which runs on the configuration unit by means of the trusted execution environment, can only be accessed by means of an emulated Ethernet connection. All interactions between the technician, and thus the computer, and the electronic unit are enabled by means of the web server, which is embodied in the trusted execution environment on the configuration unit.

In accordance with the invention the connection between the configuration unit and the electronic unit takes place by means of an SSH-protocol connection running via the trusted execution environment.

BRIEF DESCRIPTION OF THE DRAWINGS

In what follows the invention is explained in more detail in the form of an example, with the aid of the accompanying FIGURE, which schematically represents the components required for purposes of executing the method.

DETAILED DESCRIPTION OF THE PREFERRED EMBODIMENTS

In accordance with the invention, and with reference to the accompanying FIGURE, a configuration unit 1 is used for purposes of executing the method; this can be connected with a computer 2 for purposes of data communication, and has its own CPU, its own storage means and software, together with a trusted execution environment.

At the start of the method the configuration unit, which in the example shown is embodied as a USB-stick, is connected with the technician's computer 2 for purposes of data communication, wherein subsequently a web server is automatically initiated in the configuration unit 1 by means of the trusted execution environment; the web server can be accessed via the configuration unit 1 by means of an emulated Ethernet port via the port 443 (https) or 80 (http).

In the context of other configurations the connection between a configuration unit and the computer can take place without cables.

In a next step a VPN connection is subsequently made to a server 3 by means of the configuration unit 1, and, if necessary, via a firewall 4, wherein by means of the VPN connection the items of information stored on the server required for purposes of connection with the electronic units, to which a connection can be made, are synchronised with the trusted execution environment of the configuration unit 1. In particular, RSA-keys, or crypto-keys, which correspond to the current security standards, passwords, network parameters and environmental variables, amongst other items, are synchronised.

After synchronisation has taken place, an electronic unit 5 is selected by the technician by means of the web server via input means of the computer 2, for example via the keyboard or a mouse, to which electronic unit 5 a connection is made by means of the SSH-protocol via the trusted execution environment of the configuration unit 1 using the stored, synchronised items of information, wherein by means of the web server, using the display device and the input means of the computer 2, prescribed menu-driven maintenance or configuration steps can be executed.

By means of the inventive concept a "zero knowledge" connection is made between a computer 2 and an electronic unit 5; security-relevant items of information, such as e.g., passwords, RSA-keys, etc. are synchronised via a VPN-connection in the trusted execution environment of the configuration unit 1, and as required are automatically entered via the trusted execution environment via the SSH-protocol, so that these are not known to the technician, and in an advantageous manner are not stored on the computer 2.

The invention claimed is:

1. A method for purposes of making a zero knowledge connection between a computer and an electronic unit of a plurality of electronic units, the method comprising:
   connecting a configuration unit to the computer for purposes of data communication, and the configuration unit comprising a central processing unit, a storage means and software, and a trusted execution environment,
   subsequently initiating a web server in the configuration unit by means of the trusted execution environment, the web server only being accessible by an emulated Ethernet port, and establishing a secure network connection to the server by means of the configuration unit,
   synchronizing by the secure network connection items of information, which are required for purposes of connection with one of the plurality electronic units, to which a connection is to be made, with the trusted execution environment of the configuration unit,
   after synchronization has taken place, selecting the electronic unit by means of the web server via input means of the computer, to which electronic unit a connection is made by means of a secure shell protocol via the trusted execution environment of the configuration unit, using the stored, synchronized items of information, and
   executing by means of the web server prescribed menu-driven maintenance or configuration steps.

2. The method for purposes of making a zero knowledge connection between a computer and an electronic unit in accordance with claim 1, further comprising facilitating all interactions between the computer and the electronic unit by means of the web server, which is embodied in the trusted execution environment on the configuration unit.

3. The method for purposes of making a zero knowledge connection between a computer and an electronic unit in accordance with claim 1, wherein the configuration unit is embodied as a universal serial bus stick.

4. A method of making a zero knowledge connection between a computer and an electronic unit of a plurality of electronic units, the method comprising:
   initiating the method by connecting a configuration unit to the computer for purposes of data communication, the configuration unit having a central processing unit, a storage means and software and a trusted execution environment,
   subsequently initiating a web server in the configuration unit by the trusted execution environment, the web server only being accessible by an emulated Ethernet port,
   subsequently making, via the configuration unit, a secure network connection to a server,
   synchronizing, via the secure network connection, items of information which are required for establishing a connection with one of the plurality of the electronic units by means of the trusted execution environment of the configuration unit,
   after synchronization of the items of information occurs, selecting the electronic unit by the web server via an input means of the computer, establishing the connection with the selected electronic unit by a secure shell protocol via the trusted execution environment of the configuration unit using the synchronized items of information,
   executing, via the web server, prescribed menu-driven maintenance or configuration steps on the selected electronic unit, and
   enabling all interactions between the computer and the selected electronic unit via the web server which is embodied in the trusted execution environment on the configuration unit.

5. A method of making a zero knowledge connection between a computer and an electronic unit of a plurality of electronic units, the method comprising:
   initiating the method by connecting a configuration unit to the computer for purposes of data communication, the configuration unit having a central processing unit, a storage means, software and a trusted execution environment,
   subsequently initiating a web server in the configuration unit by the trusted execution environment, the web server only being accessible by an emulated Ethernet port,
   subsequently making, via the configuration unit, a secure network connection to a server,
   synchronizing, via the secure network connection, items of information which are required for establishing a connection with one electronic unit of the plurality of the electronic units by means of the trusted execution environment of the configuration unit,
   after synchronization of the items of information occurs, selecting the electronic unit with an input means of the computer via the web server, establishing the connection with the selected electronic unit by a secure shell protocol via the trusted execution environment of the configuration unit using the synchronized items of information, executing, via the web server, prescribed menu-driven maintenance or configuration steps on the selected electronic unit, and embodying the configuration unit as a universal serial bus stick.

* * * * *